US012682567B2

(12) United States Patent
Seo

(10) Patent No.: US 12,682,567 B2
(45) Date of Patent: Jul. 14, 2026

(54) SYSTEM AND METHOD FOR MONITORING THREE-DIMENSIONAL LOCATION-BASED WORKER SAFETY MANAGEMENT

(71) Applicant: NEXTCORE TECHNOLOGY CO., LTD., Seoul (KR)

(72) Inventor: Won Ki Seo, Seongnam-si (KR)

(73) Assignee: NEXTCORE TECHNOLOGY CO., LTD., Seoul (KR)

( * ) Notice: Subject to any disclaimer, the term of this patent is extended or adjusted under 35 U.S.C. 154(b) by 126 days.

(21) Appl. No.: 18/565,606

(22) PCT Filed: Oct. 18, 2022

(86) PCT No.: PCT/KR2022/015877
§ 371 (c)(1),
(2) Date: Nov. 30, 2023

(87) PCT Pub. No.: WO2023/068767
PCT Pub. Date: Apr. 27, 2023

(65) Prior Publication Data
US 2024/0265632 A1 Aug. 8, 2024

(30) Foreign Application Priority Data

Oct. 19, 2021 (KR) ........................ 10-2021-0139323

(51) Int. Cl.
*G06T 17/05* (2011.01)
*G06Q 10/0631* (2023.01)
(52) U.S. Cl.
CPC ...... *G06T 17/05* (2013.01); *G06Q 10/063114* (2013.01)

(58) Field of Classification Search
CPC .......... H04W 4/029; G06T 17/05; G06T 7/20; G06V 40/20; G06Q 10/063114; G06Q 10/06
See application file for complete search history.

(56) References Cited

U.S. PATENT DOCUMENTS

| | | | | |
|---|---|---|---|---|
| 11,120,506 B1* | 9/2021 | Devereaux | ........... | G06V 20/176 |
| 11,870,823 B2* | 1/2024 | Um | ..................... | H04L 65/1093 |
| 2018/0314947 A1* | 11/2018 | Morris, II | ................ | G06N 5/04 |

FOREIGN PATENT DOCUMENTS

| | | |
|---|---|---|
| KR | 10-2015-0010054 A | 1/2015 |
| KR | 10-1700920 B1 | 2/2017 |

(Continued)

OTHER PUBLICATIONS

International Search Report issued in PCT/KR2022/015877; mailed Jan. 31, 2023.

*Primary Examiner* — Kee M Tung
*Assistant Examiner* — Thang Gia Huynh
(74) *Attorney, Agent, or Firm* — Studebaker Brackett PLLC

(57) ABSTRACT

The present invention relates to a system and method for monitoring three-dimensional (3D) location-based worker safety management capable of implementing a work site as a 3D model in a virtual space, allowing an icon, which can display a real-time location of a worker, to be directly registered through a worker terminal, and allowing a manager to monitor an entire work status of the work site at a glance in real time based on various types of sensing information acquired through sensing equipment at the actual work site as well as a work progress status and a location of the worker.

8 Claims, 15 Drawing Sheets

(56) References Cited

FOREIGN PATENT DOCUMENTS

| KR | 10-2042616 | B1 | 11/2019 |
| KR | 10-2021-0086072 | A | 7/2021 |
| KR | 10-2021-0115249 | A | 9/2021 |
| KR | 10-2421983 | B1 | 7/2022 |

* cited by examiner

FIG. 2A

EACH UNIT COORDINATE DATA

3D VIRTUAL MODEL

POSITIONING SIMULATION SCREEN
COMBINING RSS PATTERN AND
BAROMETER INFORMATION

SYSTEM AND METHOD FOR MONITORING THREE-DIMENSIONAL LOCATION-BASED WORKER SAFETY MANAGEMENT

CROSS-REFERENCE TO RELATED APPLICATIONS

This application is the U.S. National Stage of International Application No. PCT/KR2022/015877 filed Oct. 18, 2022, which claims benefit of priority to Korean Patent Application No. 10-2021-0139323 filed Oct. 19, 2021, the entire content of which is incorporated herein by reference.

TECHNICAL FIELD

The present invention relates to a system and method for monitoring three-dimensional (3D) location-based worker safety management, and more particularly, to a system and method for monitoring 3D location-based worker safety management capable of implementing a work site as a 3D model in a virtual space, allowing an icon, which can display a real-time location of a worker, to be directly registered through a worker terminal, and allowing a manager to monitor an entire work status of the work site at a glance in real time based on various types of sensing information acquired through sensing equipment at the actual work site as well as a work progress status and a location of the worker.

BACKGROUND ART

Recently, with the development of industries such as a large petrochemical plant and a power plant, safety accidents are occurring frequently, and the demand for safety accident prevention and monitoring is increasing.

In order to maintain the power plant, various works involving risks are inevitably involved, and managers check a daily work status through a status board in a control room.

However, this conventional work management method does not properly provide specific information or real-time status of actual safety work. As a result, it is difficult to determine the entire work progress status or changes in the control room, and it is not possible to provide necessary attention to individual field work safety, such as inability to classify and provide works requiring attention, so there are difficulties in preventing safety accidents and taking prompt action in dangerous situations.

In addition, in the case of the conventional technology, the emphasis is on receiving location information from workers and confirming locations of the workers, but in the case where works requiring safety are performed simultaneously at a large-scale site, there are difficulties in performing systematic safety monitoring and work schedule management in real time.

DISCLOSURE

Technical Problem

The present invention relates to a system and method for monitoring three-dimensional (3D) location-based worker safety management capable of implementing a work site as a 3D model in a virtual space, allowing an icon, which can display a real-time location of a worker, to be directly registered through a worker terminal, and allowing a manager to monitor an entire work status of the work site at a glance in real time based on various types of sensing information acquired through sensing equipment at the actual work site as well as a work progress status and a location of the worker.

Technical Solution

According to an embodiment of the present invention, a system for monitoring three-dimensional (3D) location-based worker safety management may include: a 3D model generation unit that generates a 3D model by reflecting a structure of an actual work site and an arrangement status of sensing equipment on a coordinate system in a virtual space and then provides the generated 3D model to worker terminals and manager terminals; a work information reflection unit that generates icons for each worker terminal and then arranges the generated icons at locations selected by each worker terminal on the 3D model, matches work information input to each worker terminal with the icons and reflects the matched work information on the 3D model, and reflects sensing information acquired through the sensing equipment of the actual work site in the sensing equipment on the 3D model; and a monitoring information providing unit that provides entire work status information reflected on the 3D model and work information for each icon reflected on the 3D model to the manager terminal to allow the manager terminal to monitor an entire work site.

When the location in the virtual space of the 3D model output to the worker terminal or the manager terminal is changed by an operation of a worker or manager, the 3D model generation unit may change locations and 3D coordinate values of the arranged icons through the work information reflection unit to correspond to the changed coordinate values of the 3D model.

The work information reflection unit may first arrange the generated icons at the locations selected by each worker terminal and then store the 3D coordinate values of the icons, and include a worker location verification unit 121 that verifies the location selected by the worker terminal by comparing confirmed global positioning system (GPS) location information with the stored 3D coordinate values corresponding to the worker terminal in case of the worker terminal where the GPS location information is confirmed, and verify the location selected by the worker terminal based on whether a motion of a worker is actually detected by a passive infrared (PIR) sensor disposed at the location when it is confirmed that the PIR sensor is disposed at the location selected by the worker terminal.

The worker location verification unit may first arrange the generated icons at the locations selected by each worker terminal and then store the 3D coordinate values of the icons, and double verify the location selected by the worker terminal by comparing primarily confirmed GPS location information with the stored 3D coordinates corresponding to the worker terminal and then secondarily confirming whether the motion of the worker is actually detected by the PIR sensor disposed at the location when it is confirmed that the PIR sensor is disposed at the location selected by the worker terminal while the GPS location information of the worker terminal is confirmed.

The work information reflection unit may include a sensing information reflection unit that reflects the sensing information, which includes temperature by work location sensed by a temperature sensor, photographing data by work location captured by photographing means, gas leakage information by work location measured by a gas meter, vibration generation information by work location sensed by a vibration sensor, and noise generation information by work location measured by a noise meter, in the sensing equipment on the 3D model.

The work information reflection unit may further include an expected risk determination unit that analyzes patterns of temperature change, gas leakage change, vibration generation change, and noise generation change by each work location based on the sensing information, generate expected scenario data for temperature change trend, gas leakage trend, vibration generation trend, and noise generation trend by each work location based on the analyzed patterns, and determine expected risk levels for each work location based on the generated expected scenario data and provide the determined expected risk level to the monitoring information providing unit.

The expected risk level determination unit may generate the expected scenario data, and reflect results of analyzing a correlation between a temperature change frequency and a temperature change amount, a gas leakage frequency and a gas leakage amount, a vibration generation frequency and a vibration generation amount, and a noise generation frequency and a noise generation amount in the expected scenario data.

The monitoring information providing unit may separately display all work locations for each risk grade through a screen of the manager terminal by classifying all the work locations reflected on the 3D model into multiple risk levels based on the expected risk levels for each work location provided through the expected risk level determination unit.

The monitoring information providing unit may classify and store icon arrangement details information and arrangement history information arranged by each user terminal, input details information and input history information of the work information input through each worker terminal, matching details information and matching history information in which the input work information matches the icon, and sensing details information and sensing history information for each sensing information obtained through the sensing equipment, and then provide the classified and stored information to the manager terminal.

According to another embodiment of the present invention, a method of monitoring three-dimensional (3D) location-based worker safety management may include: generating, by through a 3D model generation unit, a 3D model by reflecting a structure of an actual work site and an arrangement status of sensing equipment on a coordinate system in a virtual space and then providing the generated 3D model to worker terminals and manager terminals; generating, by a work information reflection unit, icons for each worker terminal and then arranging the generated icons at locations selected by each worker terminal on the 3D model, matching work information input to each worker terminal with the icons and reflecting the matched work information on the 3D model, and reflecting sensing information acquired through the sensing equipment of the actual work site in the sensing equipment on the 3D model; and providing, by a monitoring information providing unit, entire work status information reflected on the 3D model and work information for each icon reflected on the 3D model to the manager terminal to allow the manager terminal to monitor an entire work site.

Advantageous Effects

According to one aspect of the present invention, by implementing the work site in the virtual space by the 3D model and allowing the icon, which can display the real-time location of the worker, to be directly registered through the worker terminal, it is possible for the worker to directly display his/her work location without the separate tag or sensor for knowing the location of the worker.

In addition, according to one aspect of the present invention, it is possible to be able to express the intuitive work location and work status inside a building or factory in the form of the dashboard through the 3D-based engine.

In addition, according to one aspect of the present invention, it is possible to detect the dangerous situations of the worker in real time through linkage with various types of sensing equipment deployed at the actual work site, and it is possible for a manager to identify the location of the worker performing the dangerous work and to manage the location of the worker accordingly on the 3D model created based on the actual work site in the virtual space and take quick action when a danger occurs.

In addition, since the conventional 3D work expression uses a method of generating 3D content, displaying the generated 3D content through a 3D engine display tool (e.g., unit, cesium), and then expressing the generated 3D content on the web, it is difficult to display or register the location in real time on the web screen. However, according to the present invention, it is possible to immediately register or delete the 3D content at the location desired to be displayed inside or outside the 3D model on the web screen without the 3D engine display tool.

In addition, according to one aspect of the present invention, by visualizing the location and safety environment of the field worker and providing the location and safety environment to the manager, it is possible for the manager to intuitively identify and manage all current status of the work site.

BRIEF DESCRIPTION OF THE DRAWINGS

FIGS. 2A and 2B are diagrams illustrating a state in which a 3D model generation unit 110 generates and implements a 3D model on a coordinate system in a virtual space.

FIGS. 4A to 4F are diagrams illustrating a state in which work information for each work location classified into multiple risk grades is separately displayed on a 3D model.

FIG. 5 is a diagram illustrating a concept of recognizing a location and behavior pattern of a worker through a location receiver.

BEST MODE

Hereinafter, preferred examples are presented to help the understanding of the present invention. However, the following embodiments are only provided for easier understanding of the present invention, and the contents of the present invention are not limited by the embodiments.

Figure 1:
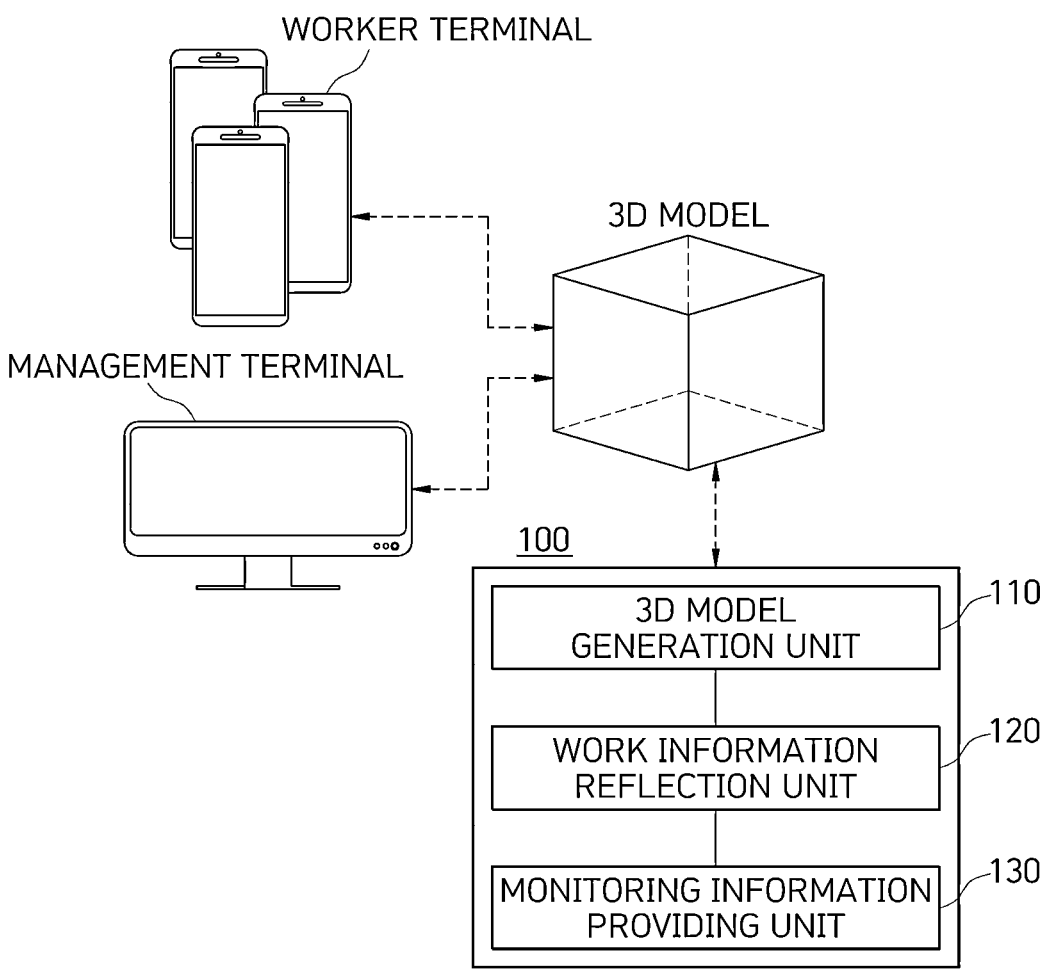
FIG. 1 is a diagram schematically illustrating a configuration of a system 100 for monitoring three-dimensional (3D) location-based worker safety management according to an embodiment of the present invention.
Figure 2A:
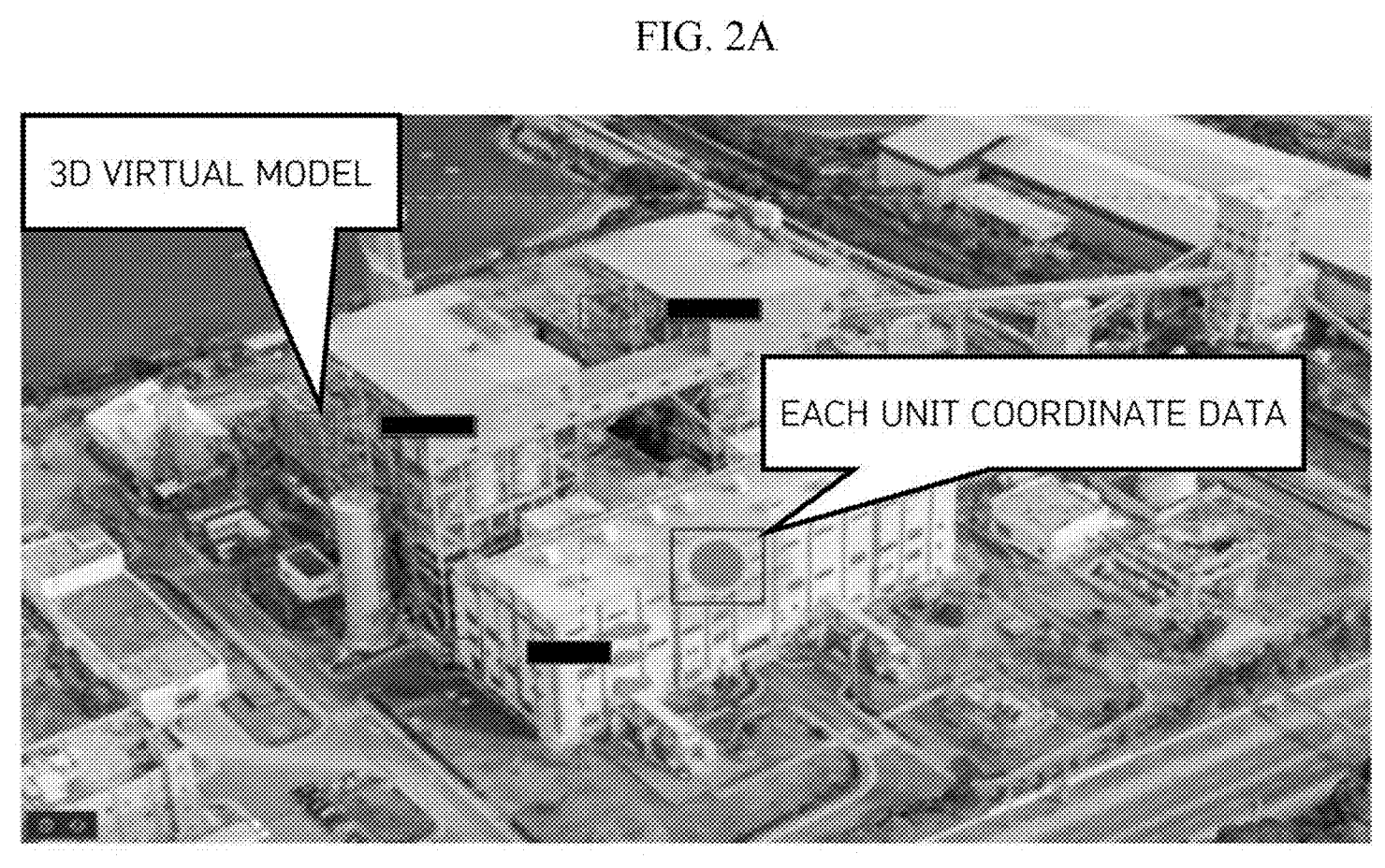
Figure 2B:
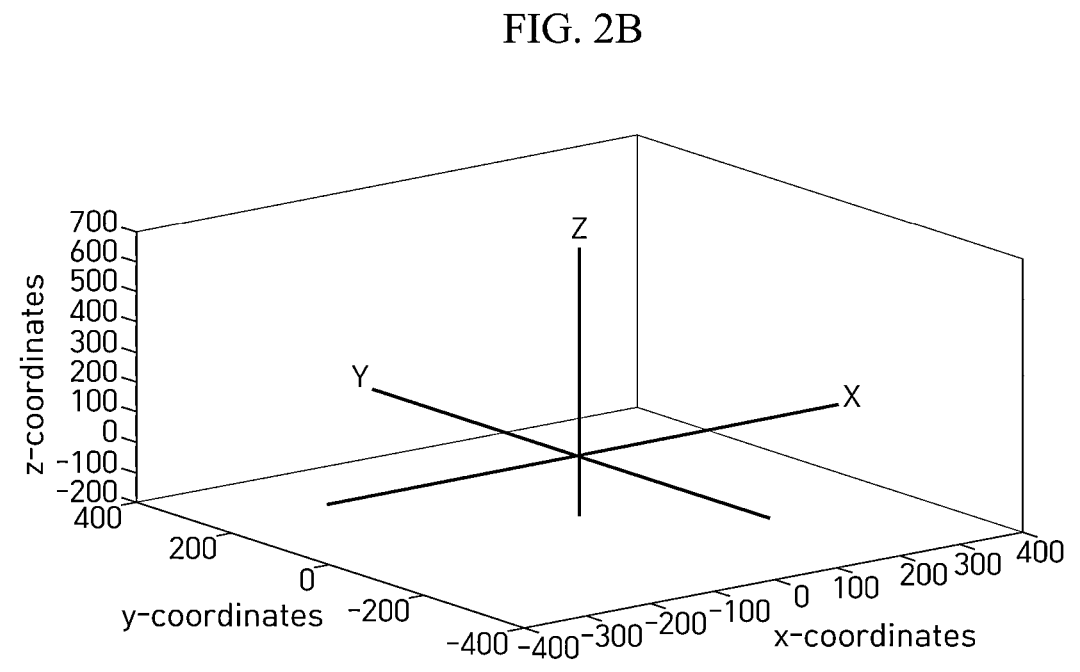
Figure 3A:
FIGS. 3A to 3D are diagrams illustrating a state in which icons for each worker terminal are located on a 3D model and visualized.
Figure 3B:
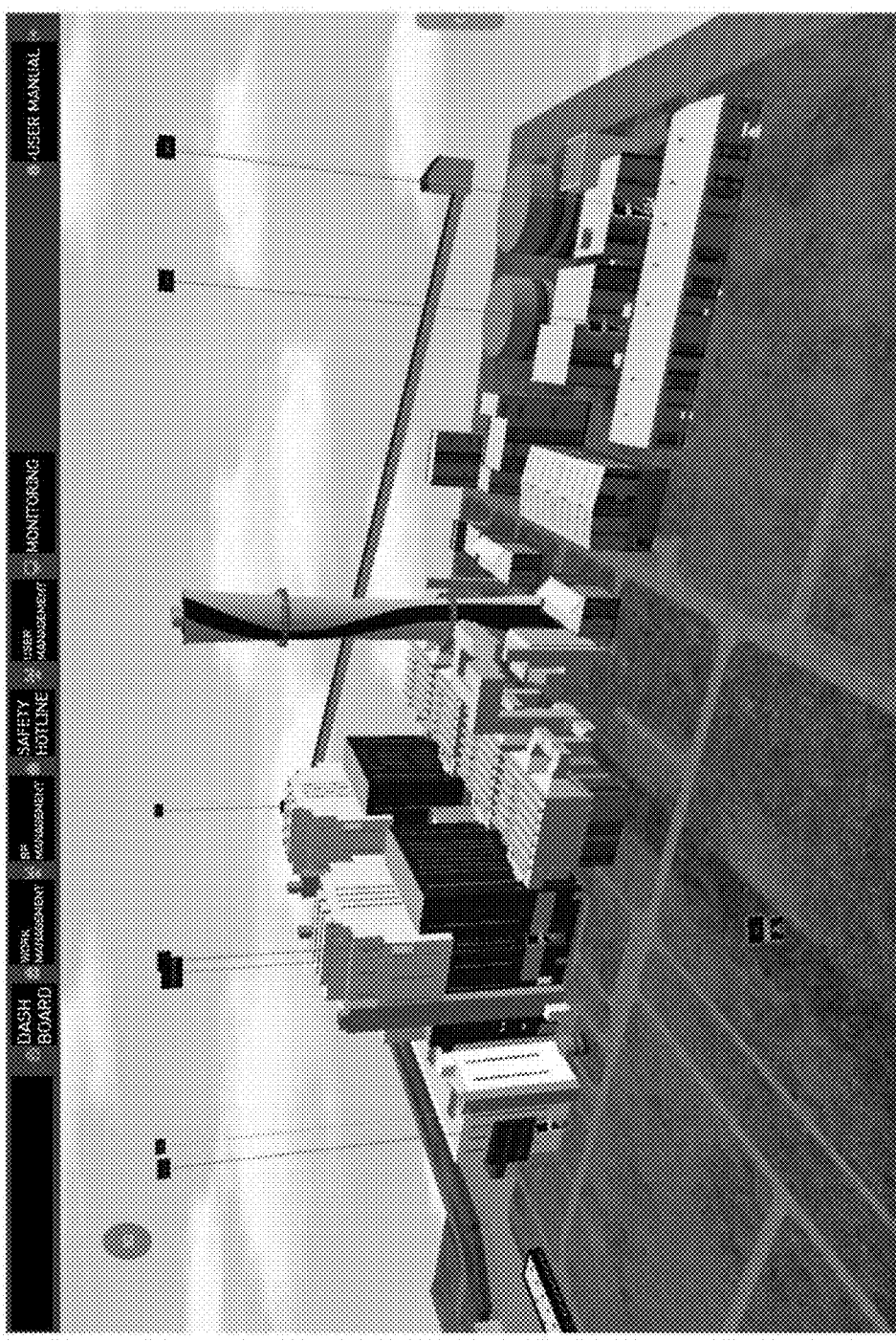
Figure 3C:
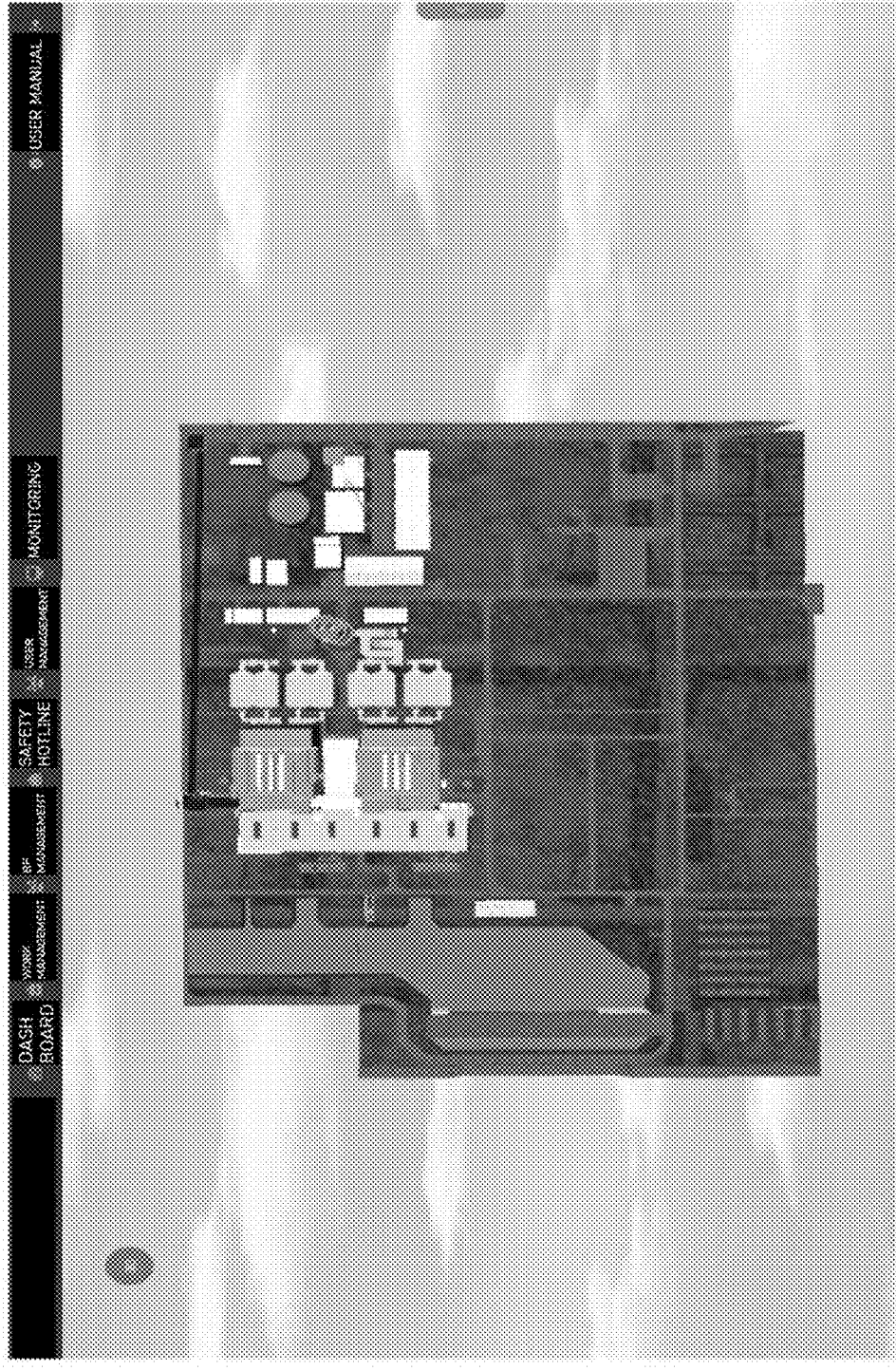
Figure 3D:
Figure 4A:
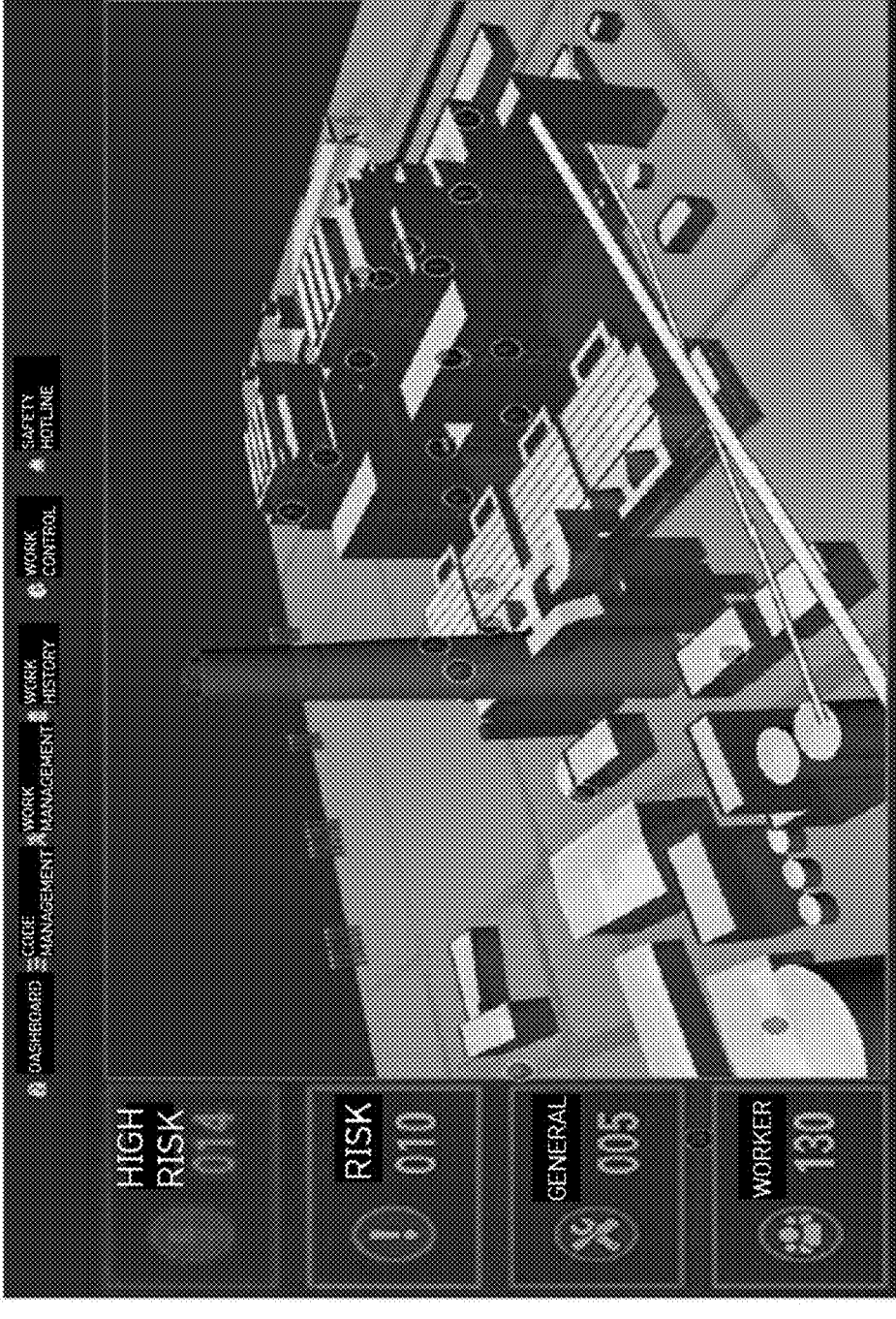
Figure 4B:
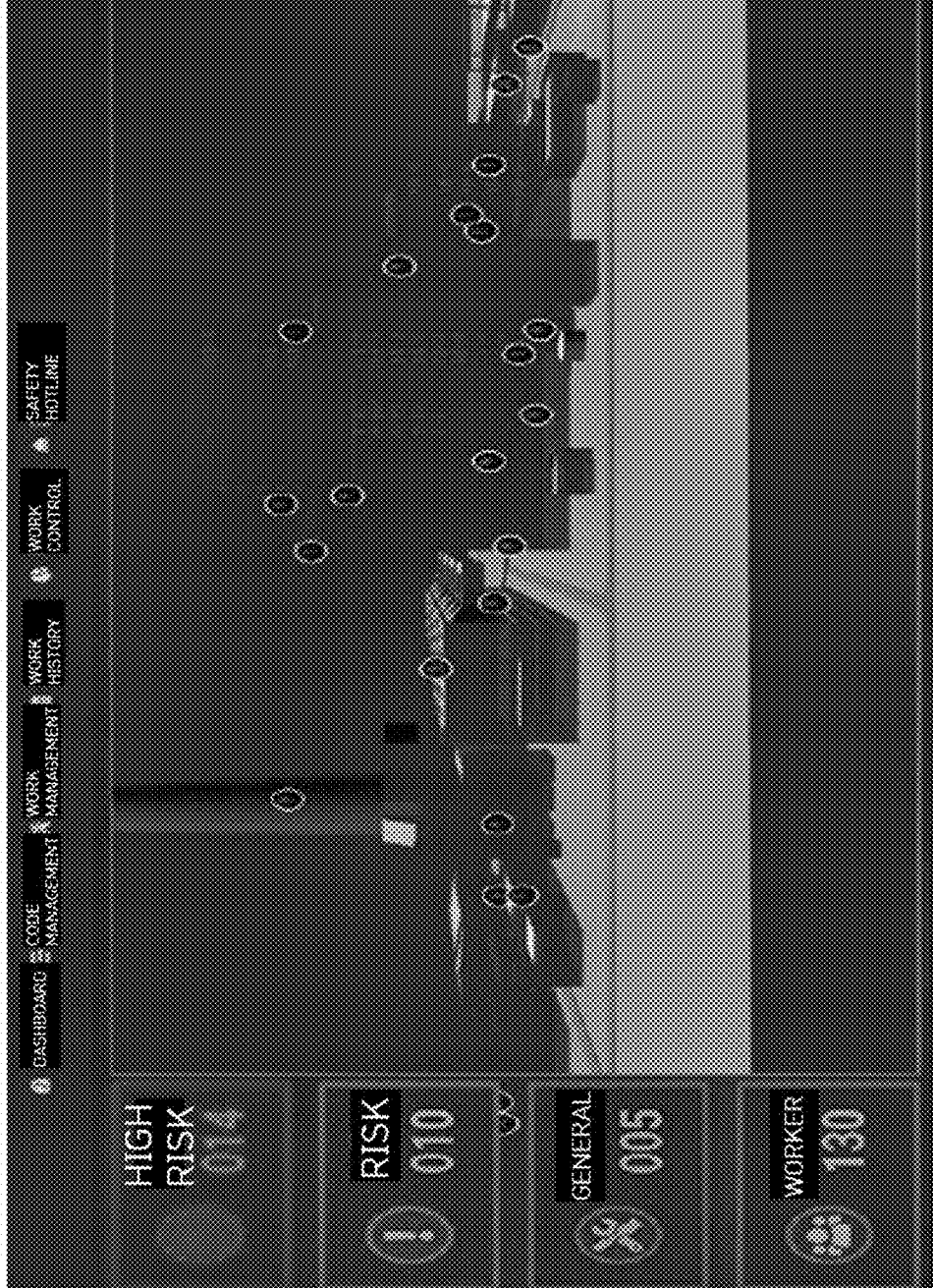
Figure 4C:
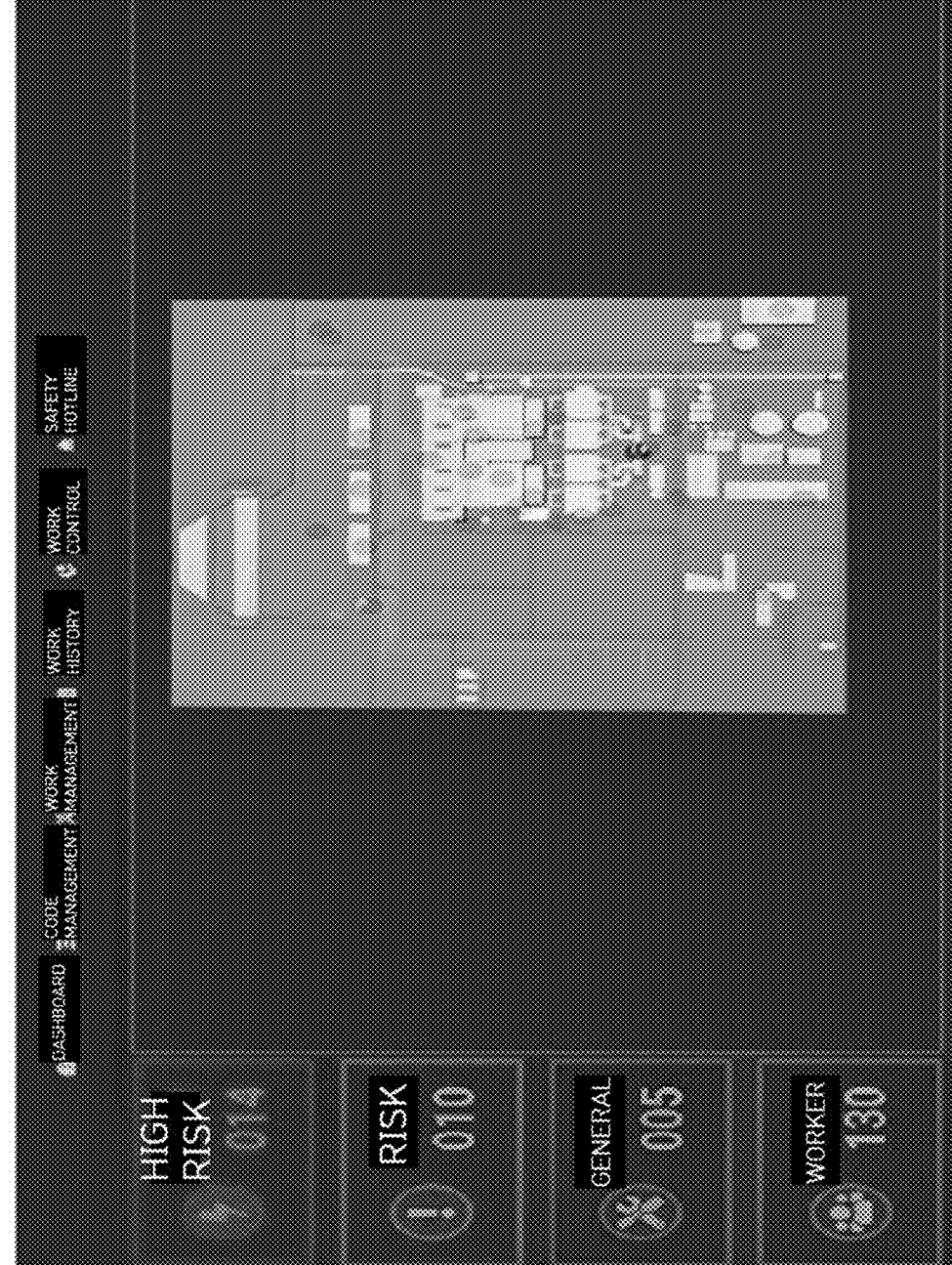
Figure 4D:
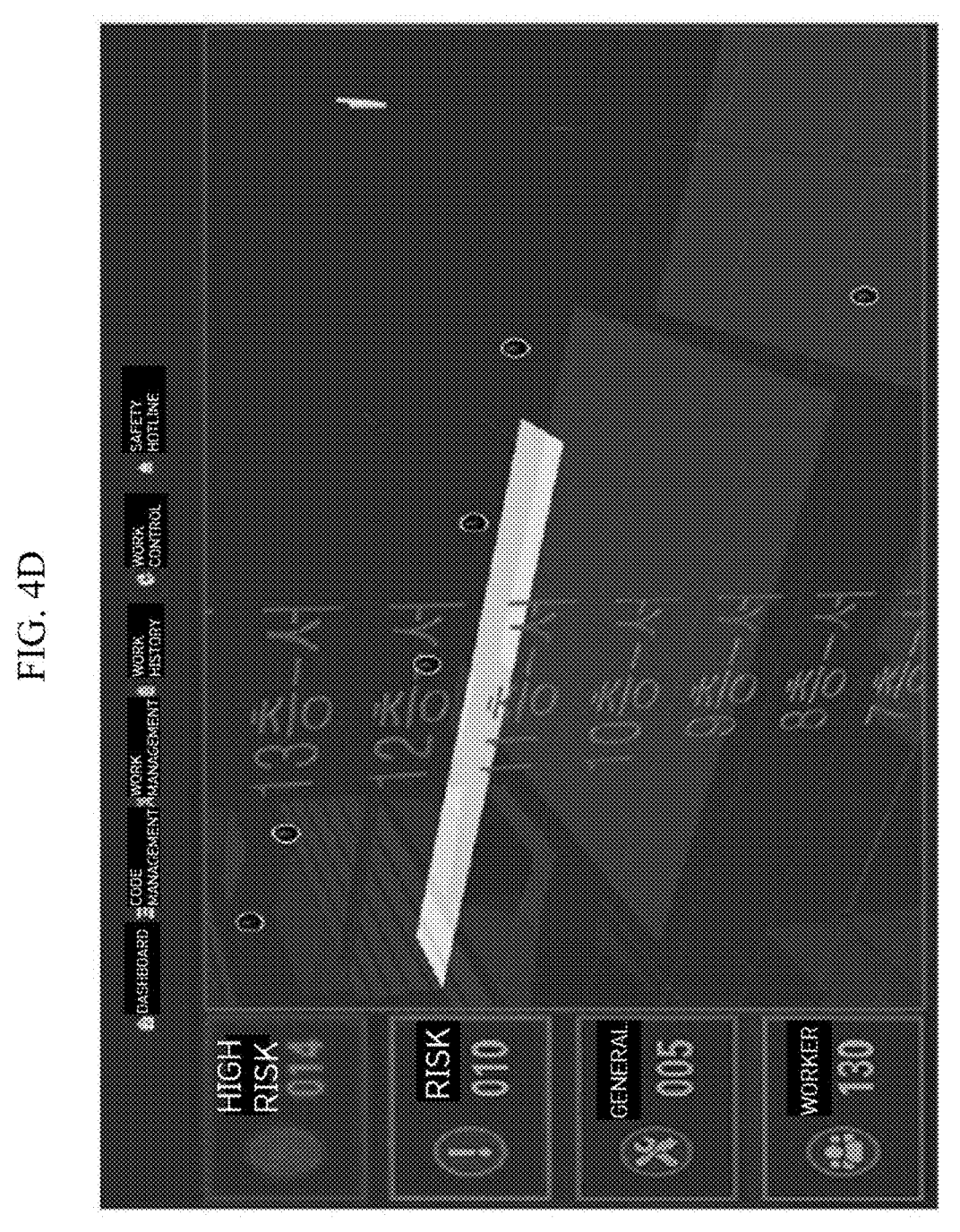
Figure 4E:
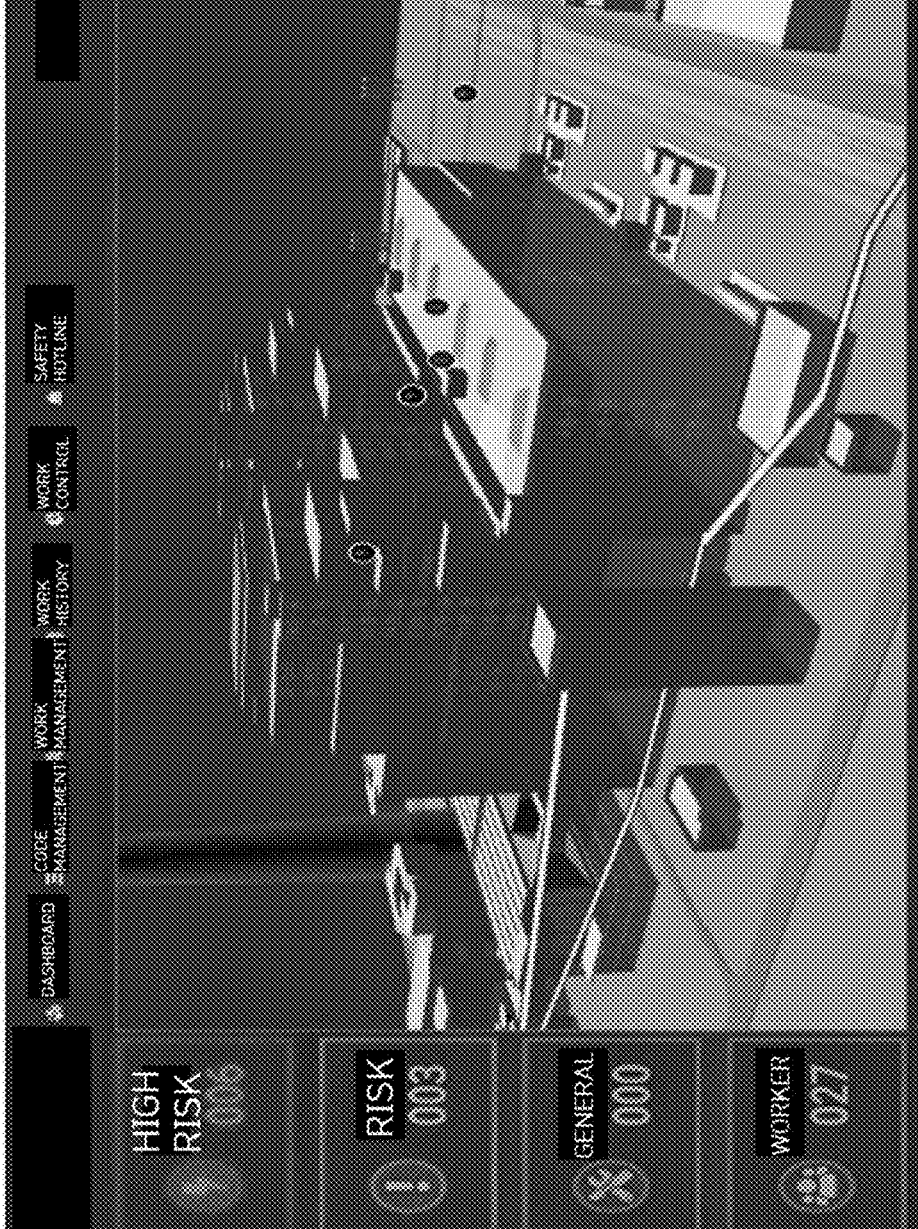
Figure 4F:
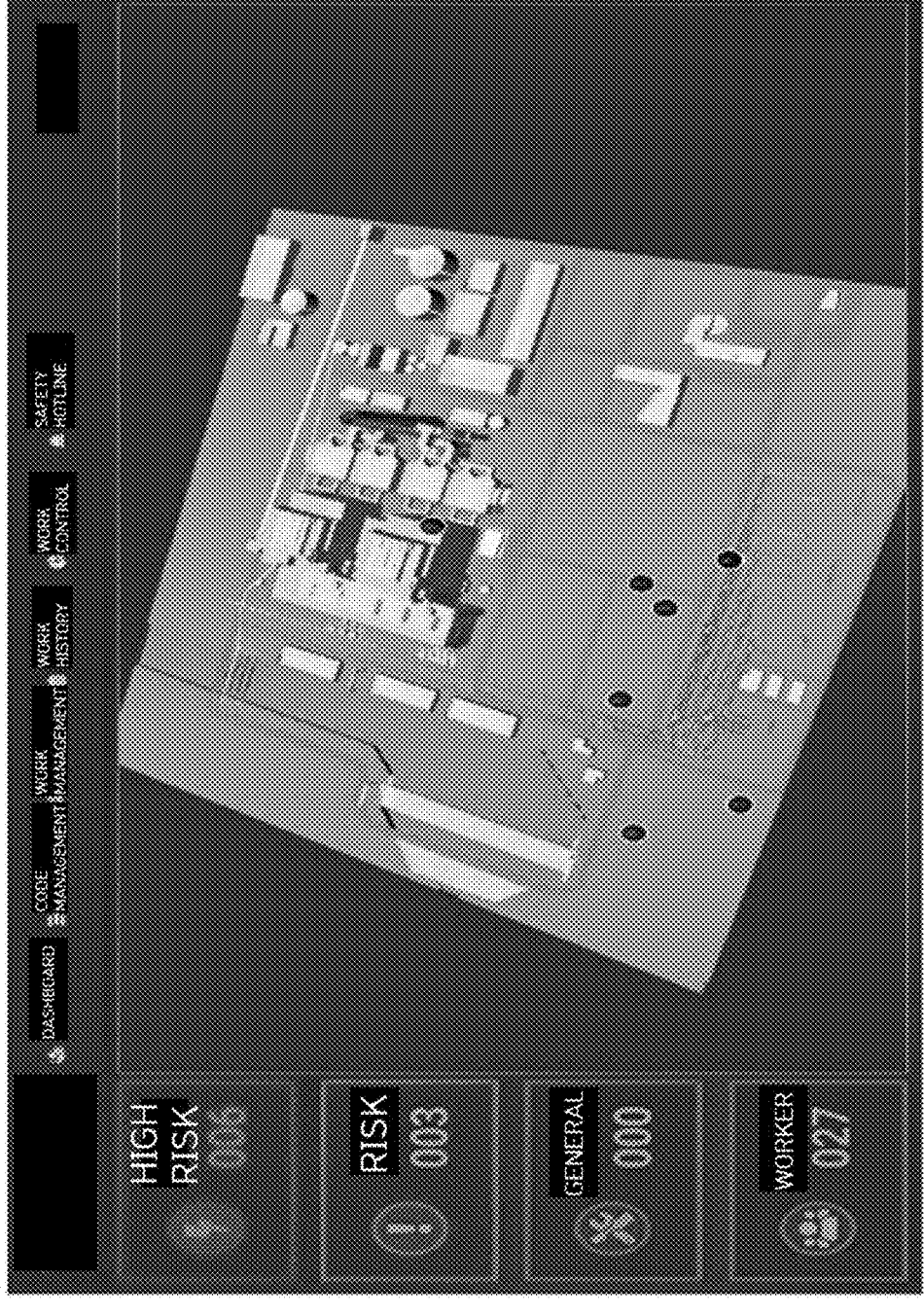

FIG. 1 is a diagram schematically illustrating a configuration of a system 100 for monitoring three-dimensional (3D) location-based worker safety management according to an embodiment of the present invention, FIGS. 2A and 2B are diagrams illustrating a state in which a 3D model generation unit 110 generates and implements a 3D model on a coordinate system in a virtual space, FIGS. 3A to 3D are diagrams illustrating a state in which icons for each worker terminal are located on a 3D model and visualized, and FIGS. 4A to 4F are diagrams illustrating a state in which work information for each work location classified into multiple risk grades is separately displayed on a 3D model.

Referring to FIGS. 1 to 4F, the system 100 for monitoring 3D location-based worker safety management according to an embodiment of the present invention may be configured to largely include a 3D model generation unit 110, a work information reflection unit 120, and a monitoring information providing unit 130.

The 3D model generation unit 110 generates a 3D model by simulating and reflecting a structure of actual work sites (e.g., power plant, factory, etc.) and an arrangement status of various sensing equipment on the coordinate system in the virtual space and provides the generated 3D model to the work terminal and the manager terminal, so the generated 3D model can be inquired and confirmed in real time at any time through the worker terminal and manager terminal.

Generally, in the process of generating an actual work site as 3D content through a 3D work representation in a virtual space, a method of displaying 3D content through a 3D engine display tool (e.g., unit, cesium, etc.) and then outputting the 3D content to a web is used, so it is difficult for a worker to display or register a location on a web screen in real time using his/her terminal. This is because, in order to re-display and update the location on the web screen, the loaded web screen should be recompiled using the 3D engine display tool and then reloaded.

In contrast, the 3D model generation unit 110 according to the present invention generates a 3D model that matches coordinates of 3D reality through the development of an FBXLoader and 3D tree engine based on open source software (OSS) and displays the generated 3D model in real time. The 3D model generation unit 110 may lighten a file by deleting unnecessary scanned points of the 3D model for the actual scanned work site, and in particular, allow a worker to directly arrange icons to display his/her location on the 3D model displayed on the web screen through his/her worker terminal and immediately reflect the icons in the web screen, and thus, has the advantage of not requiring compilation and reloading of the 3D engine display tool described above.

Meanwhile, the 3D model generation unit 110 may change the locations and 3D coordinate values of the arranged icons through the work information reflection unit 120, which will be described later, to correspond to the changed coordinate values of the 3D model when the location in the virtual space of the 3D model output to the worker terminal or manager terminal changes by the operation (for example, the worker or manager pushes the 3D model output to his/her terminal with his/her finger to move the location of the 3D model, or zooms in or out the 3D model using a pinch zoom-up function, etc.) of the worker or manager.

By registering the icon on the 3D model generated by the 3D model generation unit 110 by reflecting an actual arrangement location of safety-related sensing equipment (for example, CCTV, portable camera, temperature sensor, gas meter, vibration sensor, noise sensor, etc.) in addition to the location of the icon located by the worker terminal, sensing information, photographing information, etc., through the sensing equipment may be output in real time when the icon is selected through the worker terminal or manager terminal.

The work information reflection unit 120 generates and arranges an icon at a location on the 3D model selected by the worker terminal, matches work information such as various work details and various work history input to each worker terminal to the icon, and reflects the sensing information obtained through the sensing equipment at the actual work site in the sensing equipment on the 3D model.

More specifically, the work information reflection unit 120 allows managers to identify locations of workers by locating an icon directly selected by the worker terminal on the 3D model and storing the 3D coordinate value of the icon in the coordinate system.

Figure 5:
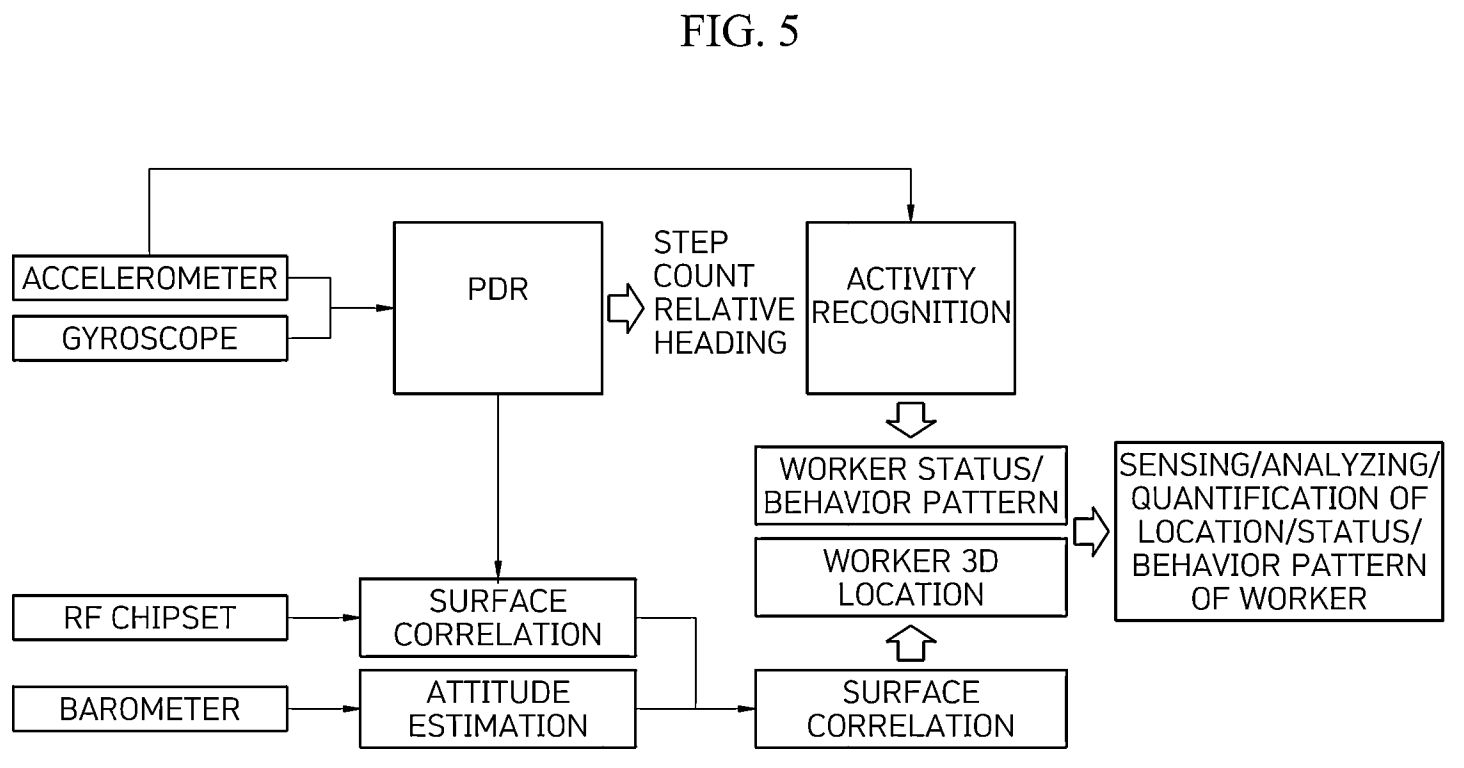

In this case, the work information reflection unit 120 basically identifies the location of the worker based on the 3D coordinate values of the icons of the locations selected by each worker terminal without tracking tags and locations of each worker terminal, and when the worker terminal is a worker terminal that can confirm global positioning system (GPS) location information, may include a worker location verification unit 121 that verifies the location of the worker by comparing the confirmed GPS location information with the 3D coordinate value correspondingly stored by the worker terminal. In an embodiment, the work information reflection unit 120 standardizes the GPS location information (coordinate values) of the worker terminal and an RF signal (RSS) of the location receiver into location pattern data, and displays the space and location of the worker by symmetrically matching the data with the location data on the 3D model in real time. In this case, in the case of a location receiver, sensing data on a location and behavior pattern of a worker may be analyzed using an altitude sensor, a barometric pressure sensor, and an RF module mounted on the worker terminal, as illustrated in FIG. 5.

Figure 6:
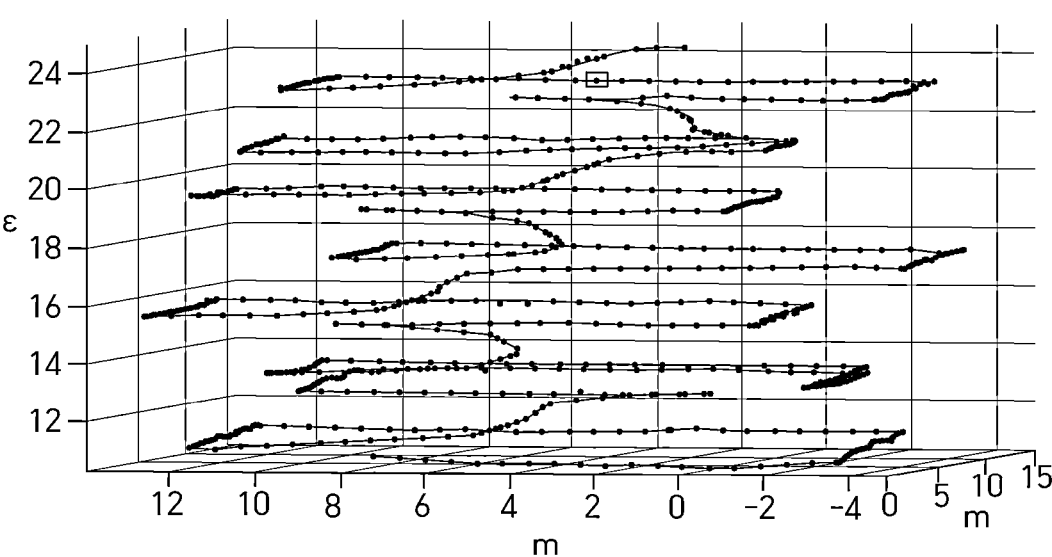
FIG. 6 is a diagram illustrating a positioning simulation screen generated by the work information reflection unit 120 using an RSS pattern and barometer information.

In addition, in an embodiment, the work information reflection unit 120 compares accumulated RSS pattern data measured according to movement of a pedestrian (the change in the location of the worker terminal) with RSS pattern data pre-stored in a database, and searches for the location in the database that have the most similar patterns. This is a positioning technique based on the spatial pattern of RSS, and the work information reflection unit 120 may generate a positioning simulation as illustrated in FIG. 6 using the RSS pattern and barometer information that use the collected data. In an embodiment, when a worker mistakes his or her current location through his or her worker terminal and selects different locations to arrange icons, the worker location verification unit 121 may verify that the worker arranges the icons at the wrong location by comparing the 3D coordinates of the icons on the 3D model with the GPS location information of the worker terminal. When the 3D coordinate value of the icon exceeds a preset range or radius compared to the GPS location information of the worker terminal, the worker location verification unit 121 may cause a pop-up message, such as 'Please confirm the current location again to modify the icon arrangement location,' to be output through the worker terminal.

As another example, the worker location verification unit 121 may basically identify the location of the worker based on the 3D coordinate values of the icons at the locations selected by each worker terminal without tags and location tracking of each worker terminal, and when it is confirmed that a passive infrared (PIR) sensor is disposed at the location (the location of the icon directly arranged by the worker on the 3D model) selected by the worker terminal, may identify whether the motion of the worker is actually detected at the location (the location of the icon directly arranged by the worker on the 3D model) through the PIR sensor disposed at the location and verify the location selected by the worker terminal based thereon.

For example, when a work site is located on the 20th basement level, a worker may arrange his/her location as an icon on the 3D model through his/her worker terminal. In this case, even if the worker is actually located on the 20th basement level, the worker may mistake this and arrange an icon on the 10th basement level in the 3D model.

In this case, the worker location verification unit 121 first determines whether the PIR sensor is disposed on the 10th basement level on the 3D model, and then, when it is determined that the PIR sensor is disposed, identifies whether the motion of the worker on the 10th basement level is actually detected.

When the actual motion of the worker is not detected at the location of the icon arranged by the worker terminal, the worker location verification unit 121 may determine that the worker has misrecognized his/her current location, and cause a pop-up message such as 'Please confirm the current location again to modify the icon arrangement location' to be output through the worker terminal.

In this case, in addition, the worker location verification unit 121 may operate the PIR sensor installed on all floors of the work site to identify the location where the motion is detected and then provide the identified information to the worker terminal, thereby causing a pop-up message such as 'Currently, motion is not detected on the 10th basement level, and motion is currently detected on the 13th basement level and 20th basement level. Please confirm again whether the 13th basement level or the 20th basement level is the current location to modify the icon arrangement location' to be output.

In particular, this may be performed in the case where the worker is in an extreme work environment where the GPS location information of the worker terminal may not be determined at all. This may have a great advantage in that it allows the location of the worker to be verified even if the GPS location information of the worker terminal is not identified at all.

Additionally, in an embodiment, in the process of first arranging icons at locations selected by each worker terminal and then storing the 3D coordinate values of the icons, when both the GPS location information of the worker terminal and the PIR sensor disposed at the location are confirmed, the worker location verification unit 121 primarily compares the GPS location information and the 3D coordinate values of the icons arranged on the 3D model, and then secondarily confirms whether the motion of the worker is actually being detected by the PIR sensor disposed at the corresponding location, thereby double cross-checking the locations of the arranged icons through the worker terminal.

Meanwhile, in an embodiment, the work information reflection unit 120 may include a sensing information reflection unit 122 that reflects sensing information measured through a temperature sensor, photographing means (for example, CCTV, portable cameras, etc.), a gas meter, a vibration sensor, or a noise meter that are disposed at the actual work site, on the 3D model.

More specifically, the sensing information reflection unit 122 reflects the sensing information, which includes temperature by work location sensed by a temperature sensor, photographing data (video, etc.) for each work location captured by photographing means, gas leakage information by work location measured by a gas meter, vibration generation information by work location sensed by a vibration sensor, and noise generation information by work location measured by a noise meter that is installed in the actual work site, in the sensing equipment implemented on the 3D model, thereby enabling the sensing information to be confirmed in real time through the manager terminal.

In particular, the work information reflection unit 120 may include an expected risk level determination unit 123 that determines expected risk levels for each work location based on the sensing information acquired through the sensing information reflection unit 122 and provides the determined expected risk levels to the monitoring information providing unit 130.

More specifically, the expected risk level determination unit 123 may analyze patterns of temperature change, gas leakage change, vibration generation change, and noise generation change by each work location based on the sensing information that includes the temperature by work location, the photographing data by work location, the gas leakage information by work location, vibration generation information by work location, and noise generation information by work location, and generate expected scenario data for temperature change trend, gas leakage trend, vibration generation trend, and noise generation trend by each work location based on the analyzed patterns. The generated expected scenario data is big data and may be an indicator of predicting risk by each work location. The expected risk level determination unit 123 may determine the expected risk level by each work location based on the expected scenario data and provide the determined expected risk level to the monitoring information providing unit 130.

In this case, the expected risk level determination unit 123 may generate the expected scenario data, and analyze a correlation between a temperature change frequency and a temperature change amount, a gas leakage frequency and a gas leakage amount, a vibration generation frequency and a vibration generation amount, and a noise generation frequency and a noise generation amount by work location, and reflect the analyzed results in the expected scenario data.

Based on this, the expected risk level determination unit 123 may classify the work site, work location, and work contents where dangerous work is expected, and classify the entire work location and work information reflected on the 3D model into multiple risk grades, thereby dividing and displaying all work locations for each risk grade into different colors and distinguishable images through the screen of the manager terminal.

Referring to FIGS. 4A to 4F, the work information included in the corresponding grades for each risk grade, such as a high risk group, a risk group, and a general group, may be classified and displayed on the 3D model. In this case, each grade may be divided into different colors for each risk grade and displayed.

In an embodiment, when the temperature change frequency and the temperature change amount, the gas leakage frequency and the gas leakage amount, the vibration generation frequency and the vibration generation amount, the noise generation frequency and the noise generation amount by work location exceed the preset value by a certain amount or more, the expected risk level determination unit 123 not only immediately transmits a notification signal to the manager terminal or the pre-registered worker terminal, but also transmits a warning signal for the occurrence of danger to various connected firefighting servers or disaster prevention servers, thereby taking quick action at any time.

Although exemplary embodiments of the present invention have been disclosed above, it may be understood by those skilled in the art that the present invention may be variously modified and changed without departing from the scope and spirit of the present invention described in the following claims.

The invention claimed is:

1. A system for monitoring three-dimensional (3D) location-based worker safety management, comprising:

a 3D model generation unit (110) that generates a 3D model by reflecting a structure of an actual work site and an arrangement status of sensing equipment on a coordinate system in a virtual space and then provides the generated 3D model to worker terminals and manager terminals;

a work information reflection unit (120) that generates icons for each worker terminal and then arranges the generated icons at locations selected by each worker terminal on the 3D model, matches work information input to each worker terminal with the icons and reflects the matched work information on the 3D model, and reflects sensing information acquired through the sensing equipment of the actual work site in the sensing equipment on the 3D model; and a monitoring information providing unit (130) that provides entire work status information reflected on the 3D model and work information for each icon reflected on the 3D model to the manager terminal to allow the manager terminal to monitor an entire work site, wherein the work information reflection unit (120) first arranges the generated icons at the locations selected by each worker terminal and then stores 3D coordinate values of the icons, and the work information reflection unit (120) verifies the location selected by the worker terminal by comparing confirmed global positioning system (GPS) location information with the stored 3D coordinate values corresponding to the worker terminal in case of the worker terminal where the GPS location information is confirmed, and verifies the location selected by the worker terminal based on whether a motion of a worker is actually detected by a passive infrared (PIR) sensor disposed at the location when it is confirmed that the PIR sensor is disposed at the location selected by the worker terminal, and wherein the work information reflection unit (120) first arranges the generated icons at the locations selected by each worker terminal and then stores the 3D coordinate values of the icons, and double verifies the location selected by the worker terminal by comparing primarily confirmed GPS location information with the stored 3D coordinates corresponding to the worker terminal and then secondarily confirming whether the motion of the worker is actually detected by the PIR sensor disposed at the location when it is confirmed that the PIR sensor is disposed at the location selected by the worker terminal while the GPS location information of the worker terminal is confirmed.

2. The system of claim 1, wherein when the location in the virtual space of the 3D model output to the worker terminal or the manager terminal is changed by an operation of a worker or manager, the 3D model generation unit (110) changes locations and 3D coordinate values of the arranged icons through the work information reflection unit (120) to correspond to the changed coordinate values of the 3D model.

3. The system of claim 1, wherein the work information reflection unit (120) reflects the sensing information, which includes temperature by work location sensed by a temperature sensor, photographing data by work location captured by photographing means, gas leakage information by work location measured by a gas meter, vibration generation information by work location sensed by a vibration sensor, and noise generation information by work location measured by a noise meter, in the sensing equipment on the 3D model.

4. The system of claim 3, wherein the work information reflection unit (120) analyzes patterns of temperature change, gas leakage change, vibration generation change, and noise generation change by each work location based on the sensing information, generates expected scenario data for temperature change trend, gas leakage trend, vibration generation trend, and noise generation trend by each work location based on the analyzed patterns, and determines expected risk levels for each work location based on the generated expected scenario data and provides the determined expected risk level to the monitoring information providing unit (130).

5. The system of claim 4, wherein the work information reflection unit (120) generates the expected scenario data, and reflects results of analyzing a correlation between a temperature change frequency and a temperature change amount, a gas leakage frequency and a gas leakage amount, a vibration generation frequency and a vibration generation amount, and a noise generation frequency and a noise generation amount by work location in the expected scenario data.

6. The system of claim 4, wherein the monitoring information providing unit (130) separately displays all work locations for each risk grade through a screen of the manager terminal by classifying all the work locations reflected on the 3D model into multiple risk levels based on the expected risk levels for each work location provided through the work information reflection unit (120).

7. A system for monitoring three-dimensional (3D) location-based worker safety management, comprising:

a 3D model generation unit (110) that generates a 3D model by reflecting a structure of an actual work site and an arrangement status of sensing equipment on a coordinate system in a virtual space and then provides the generated 3D model to worker terminals and manager terminals;

a work information reflection unit (120) that generates icons for each worker terminal and then arranges the generated icons at locations selected by each worker terminal on the 3D model, matches work information input to each worker terminal with the icons and reflects the matched work information on the 3D model, and reflects sensing information acquired through the sensing equipment of the actual work site in the sensing equipment on the 3D model; and a monitoring information providing unit (130) that provides entire work status information reflected on the 3D model and work information for each icon reflected on the 3D model to the manager terminal to allow the manager terminal to monitor an entire work site, wherein the monitoring information providing unit (130) classifies and stores icon arrangement details information and arrangement history information arranged by each user terminal, input details information and input history information of the work information input through each worker terminal, matching details information and matching history information in which the input work information matches the icon, and sensing details information and sensing history information for each sensing information obtained through the sensing equipment, and then provides the classified and stored information to the manager terminal.

8. A method of monitoring three-dimensional (3D) location-based worker safety management, comprising:

generating, by through a 3D model generation unit (110), a 3D model by reflecting a structure of an actual work site and an arrangement status of sensing equipment on a coordinate system in a virtual space and then providing the generated 3D model to worker terminals and manager terminals;

generating, by a work information reflection unit (120), icons for each worker terminal and then arranging the generated icons at locations selected by each worker terminal on the 3D model, matching work information input to each worker terminal with the icons and reflecting the matched work information on the 3D model, and reflecting sensing information acquired through the sensing equipment of the actual work site in the sensing equipment on the 3D model; and providing, by a monitoring information providing unit (130), entire work status information reflected on the 3D model and work information for each icon reflected on the 3D model to the manager terminal to allow the manager terminal to monitor an entire work site, wherein the work information reflection unit (120) first arranges the generated icons at the locations selected by each worker terminal and then stores 3D coordinate values of the icons, and the work information reflection unit (120) verifies the location selected by the worker terminal by comparing confirmed global positioning system (GPS) location information with the stored 3D coordinate values corresponding to the worker terminal in case of the worker terminal where the GPS location information is confirmed, and verifies the location selected by the worker terminal based on whether a motion of a worker is actually detected by a passive infrared (PIR) sensor disposed at the location when it is confirmed that the PIR sensor is disposed at the location selected by the worker terminal, and wherein the work information reflection unit (120) first arranges the generated icons at the locations selected by each worker terminal and then stores the 3D coordinate values of the icons, and double verifies the location selected by the worker terminal by comparing primarily confirmed GPS location information with the stored 3D coordinates corresponding to the worker terminal and then secondarily confirming whether the motion of the worker is actually detected by the PIR sensor disposed at the location when it is confirmed that the PIR sensor is disposed at the location selected by the worker terminal while the GPS location information of the worker terminal is confirmed.

\* \* \* \* \*